3,418,334
PROCESS FOR THE PREPARATION OF SUBSTITUTED PARABANIC ACIDS

Paul J. Stoffel, St. Louis, Mo., assignor to Monsanto Company, St. Louis, Mo., a corporation of Delaware
No Drawing. Filed Oct. 25, 1963, Ser. No. 318,819
8 Claims. (Cl. 260—309.5)

This invention relates to a new class of substituted parabanic acids and to a procedure for preparing the new compounds from readily available raw materials. More specifically, the invention is directed to herbicidal compounds and their use in controlling the growth of vegetation.

The novel procedure involves a reaction in accordance with the structural equation:

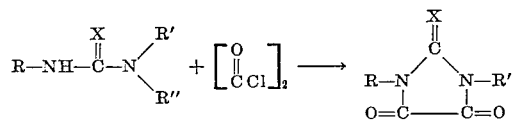

wherein X is oxygen and each of R and R' is selected from the class consisting of the hydrocarbon radicals of the group consisting of alkyl having up to 12 carbon atoms, alkenyl having up to 12 carbon atoms, alkynyl having up to 12 carbon atoms, cycloalkyl having from three to eight carbon atoms, phenyl and benzyl; and the said hydrocarbon radicals containing substituents selected from the class consisting of alkyl of up to four carbon atoms, alkoxy of up to four carbon atoms, chlorine, bromine, nitro and phenyl; and wherein R'' is a radical selected from the class consisting of secondary alkyl having three to eight carbon atoms, tertiary alkyl having four to eight carbon atoms, and cycloalkyl having from four to eight carbon atoms.

The new family of compounds are prepared by mixing the substituted ureas with oxalyl chloride and heating. To prevent an excessive rate of reaction, the reactants are diluted with an inert solvent in which the reactants and products are soluble. The use of a solvent medium enables a better control of the rate and temperature of reaction if the solvent is refluxed within the desired temperature range. Temperatures between 30° C. and 180° C. will provide useful reactions, but at the specified lower temperature the rate of reaction may not be practicable. At the temperature of 180° C. the rate of reaction may become too rapid and some decomposition may result. To maintain good reaction conditions solvents such as benzene, toluene, xylene, chlorobenzene, dichlorobenzene, chlorotoluene, bromotoluene and bromobenzene may be used and these will reflux within the desired range of temperature. A particular solvent medium may be used under pressure or at reduced pressures to enable an increase or reduction of temperatures of reflux, thereby obtaining optimum reaction conditions.

The separation of products from the reaction mixtures may be accomplished by evaporation of the solvent if a volatile solvent is used in the preparation of a product of relatively high boiling point. If the boiling points of solvents and products are in the same order of magnitude, separation may be effected by addition of a non-solvent for the product, but which is miscible in the reaction medium. By this expedient the solubility of the product in the reaction medium is reduced and it is then possible to precipitate the product by cooling the reaction medium. Purification of the product by recrystallization can be effected from suitable solvents after heating the solution with decolorizing charcoal.

Further details of the preparation of the new compounds are set forth hereinafter in specific examples.

EXAMPLE 1

A mixture of 13.0 grams of oxalyl chloride and 28.5 grams of 3-(3,4-dichlorophenyl-1-isopropyl-1-(2-propynyl)urea were dissolved in 100 ml. of benzene and heated at reflux temperature for eight hours. During the reaction HCl was evolved and this evolution enables the determination of the extent of reaction. When the reaction subsided the reaction mass was cooled and the product was precipitated. Recrystallization from methanol provided a product (M.P. 188.6–189.1° C.). It was found to have the structure:

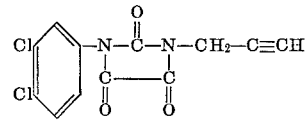

EXAMPLE 2

The procedure of Example 1 was repeated except the oxalyl chloride was reacted with 1-methyl-1-butyl-3-benzyl urea to prepare a compound of the structure:

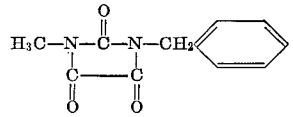

EXAMPLE 3

A toluene solution of 1,3-diallyl-1-cyclohexyl urea was reacted with oxalyl chloride at reflux temperature for three hours. The resulting product was identified as that having the structure:

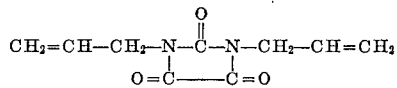

EXAMPLE 4

The substituted urea-1-sec-butyl 1-methyl-3-(4-nitrophenyl)urea was heated with oxalyl chloride in benzene at reflux temperature until the HCl evolution subsided. The product was identified as that having the structure:

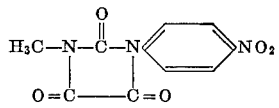

EXAMPLE 5

A benzene solution of 1-(3-ethoxypropyl)-1-sec-amyl-3-p-methylbenzyl urea was refluxed with oxalyl chloride. The product separated from the reaction mixture was found to have the structure:

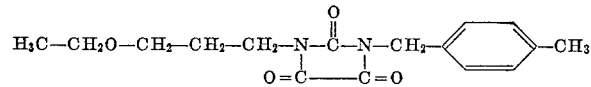

EXAMPLE 6

The substituted urea 1,3-dicyclohexyl-1-methyl urea was heated with oxalyl chloride at reflux temperature in a benzene reaction mixture to produce a compound of the structure:

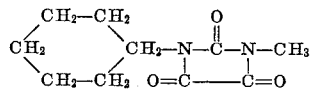

Although the invention is described with respect to specific modifications, it is not intended that the details thereof are limitations on the scope of the invention except to the extent incorporated in the following claims.

What is claimed is:
1. The method of preparing a compound of the structure:

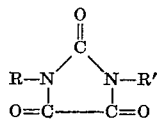

which comprises heating an inert solvent solution of oxalyl chloride and a compound of the structure:

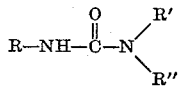

wherein R and R' are alkyl radicals of up to 12 carbon atoms and R" is a secondary alkyl radical at a temperature between 30° C. and 180° C.

2. The method of preparing a compound of the structure:

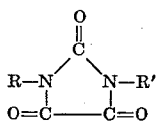

which comprises heating an inert solvent solution of oxalyl chloride and a compound of the structure:

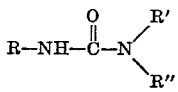

wherein R and R' are alkenyl radicals of up to 12 carbon atoms and R" is a secondary alkyl radical at a temperature between 30° C. and 180° C.

3. A method of preparing a compound of the structure:

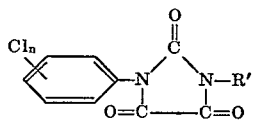

which comprises heating at a temperature from 30° C. to 180° C. an inert solvent solution of oxalyl alcohol and a compound of the structure:

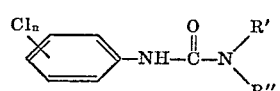

wherein $n$ is an integer from zero to four; wherein R' is an alkenyl radical of up to 12 carbon atoms; and wherein R" is a secondary alkyl radical.

4. The method of preparing 3-(3,4-dichlorophenyl)-1-(2-propynyl) parabanic acid which comprises heating at reflux temperature in an inert solvent solution 3-(3,4-dichlorophenyl)-1-isopropyl-1-(2-propynyl) urea with oxalyl chloride.

5. The method of preparing 1-methyl-3-benzyl parabanic acid which comprises heating at reflux temperature in an inert solvent solution 1-methyl-1-t-butyl-3-benzyl urea with oxalyl chloride.

6. The method of preparing diallyl parabanic acid which comprises heating at reflux temperature in an inert solvent solution 1,3-diallyl-1-cyclohexyl urea with oxalyl chloride.

7. The method of preparing 1-methyl-3(4-nitrophenyl) parabanic acid which comprises heating at reflux temperature in an inert solvent solution 1-sec.-butyl-1-methyl-3-(4-nitrophenyl) urea with oxalyl chloride.

8. The method of preparing 1-(3-ethoxypropyl)-3-(p-methylbenzyl) parabanic acid which comprises heating at reflux temperature in an inert solvent solution 1-(3-ethoxypropyl)-1-sec-amyl-3-(p-methylbenzyl) urea and oxalyl chloride.

References Cited

UNITED STATES PATENTS

| | | | |
|---|---|---|---|
| 2,463,986 | 3/1949 | Longley | 260—309.5 |
| 2,895,817 | 7/1959 | Luckenbaugh | 71—2.5 |

OTHER REFERENCES

Beilstein: Handbuch der Organischen Chemie I, 4th ed., vol. 24 (Literature to 1910), pp. 452–460 (1936).

Beilstein: Handbuch der Organischen Chemie II, 4th ed., vol. 24, 1st supplement (Literature for 1910–1919), pp. 401–5 (1936).

Biltz et al.: Berichte, vol. 46, pp. 1392–1400 (relied on) (1913).

Schulz et al.: Angew. Chem. vol. 74, pp. 250–1 (Apr. 7, 1962).

Stachel: Angew. Chem., vol. 71, p. 246 (1959).

Steiger: Monatshefte für Chemie, vol. 37, pp. 642–9 (1916).

Todd et al.: Jour. Chem. Soc. (London), 1946, pp. 628–33.

HENRY R. JILES, Primary Examiner.

N. TROUSOF, Assistant Examiner.

U.S. Cl. X.R.

71—92; 260—553